United States Patent
Ross et al.

(10) Patent No.: US 8,468,057 B2
(45) Date of Patent: Jun. 18, 2013

(54) SYSTEM AND METHOD FOR PERSONALIZED ACCESS TO VEHICLE DATA SERVICES THROUGH PORTALS

(75) Inventors: Steven J. Ross, Madison Heights, MI (US); Stephen C. Habermas, Beverly Hills, MI (US); Vinodh C. Ravi, Auburn Hills, MI (US); Jeffrey G. Ravas, Oxford, MI (US)

(73) Assignee: General Motors LLC, Detroit, MI (US)

( * ) Notice: Subject to any disclaimer, the term of this patent is extended or adjusted under 35 U.S.C. 154(b) by 2336 days.

(21) Appl. No.: 10/767,297

(22) Filed: Jan. 28, 2004

(65) Prior Publication Data

US 2005/0165639 A1 Jul. 28, 2005

(51) Int. Cl.
*G06Q 30/00* (2012.01)
*G06Q 50/00* (2012.01)
(52) U.S. Cl.
USPC ............... 705/14.64; 705/14.66; 701/32.7; 701/33.4; 715/234
(58) Field of Classification Search
None
See application file for complete search history.

(56) References Cited

U.S. PATENT DOCUMENTS

| | | | |
|---|---|---|---|
| 5,911,776 A * | 6/1999 | Guck | 709/217 |
| 6,526,335 B1 * | 2/2003 | Treyz et al. | 701/1 |
| 7,093,194 B2 * | 8/2006 | Nelson | 715/234 |

* cited by examiner

*Primary Examiner* — Namrata Boveja
*Assistant Examiner* — Katherine Kolosowski-Gager
(74) *Attorney, Agent, or Firm* — Dierker & Associates, P.C.

(57) ABSTRACT

Managing subscriber vehicle data in a vehicle data management system includes receiving and storing vehicle data, associating at least one client class with at least one corresponding targeted data format, receiving a client data request from a client, determining a client identity based on the client data request; and providing targeted data to the client responsive to the data request. The targeted data format is based on the determination of the identified client requesting the client data. An article for managing subscriber vehicle data in a vehicle data management system is described having a computer readable modulated carrier wave embodying means embedded in the modulated carrier wave for storing received vehicle data, means for associating at least one client class with at least one corresponding targeted data format, means for determining a client identity based on a received client data request and means for providing targeted data to the client responsive to the data request.

14 Claims, 4 Drawing Sheets

SYSTEM AND METHOD FOR PERSONALIZED ACCESS TO VEHICLE DATA SERVICES THROUGH PORTALS

FIELD OF THE INVENTION

The invention relates to management of vehicle data, and more particularly to a system and method for personalized vehicle data management in an interactive vehicle information service system.

BACKGROUND OF THE INVENTION

Many passenger vehicles now incorporate an integrated communication system. A Vehicle Communication Unit (VCU) used in conjunction with a Wide Area Network (WAN) such as a cellular telephone network or a satellite communication system allows for a variety of fee-based subscription services to be provided in a mobile environment. The VCU is typically a vehicle telematics device including a cellular radio, satellite transceiver and/or global positioning capabilities. Communication through a carrier service may be initiated at the VCU at turn-on or through manual or voice command phone number entry. Typically, a radio communication link is established between the VCU and a Wide Area Network (WAN), using a node of the WAN in the vicinity of the VCU. In addition to enabling telecommunication services, a VCU may be configured to receive various types of data from a service provider. In some implementations, a VCU is also configured to provide various vehicle system information data to the service provider from the vehicle such as through a so-called vehicle data upload (VDU) operation. Such vehicle system information typically includes data such as service codes and error codes, for example. Subscription service providers generally offer bundled services to a user of an integrated vehicle communication system. In operation, a telematics service provider has limited access to real time vehicle information such as error codes generated by components on the vehicle bus.

There may be several different parties interested in accessing vehicle information and subscriber service data during the term of a service subscription. For instance, a consumer, product engineer, service representative or fleet manager may be interested in various types of unrelated customer and vehicle related data for one or more vehicles enrolled in the subscriber service. Presently, customer, subscription related, and vehicle related information is provided to a service provider at the inception of subscription through a dealer or service provider agent. Generally, such information such as the make and model of the subscriber vehicle, subscription service options and subscriber identification data is provided through a dealer network computer system, through interaction with telematics service providers and call center advisors, or through paperwork delivered to the service provider by the dealer.

At present there are no systems and methodologies for compiling, collating and presenting all vehicle-related data such as data collected from a VCU, subscription service data, vehicle make and model information and the like. Furthermore, there is presently no way for parties having an interest in different types of vehicle subscription telematics services data to be presented with the data in a form that is targeted to their area of specific interest or concern.

It would be desirable, therefore, to provide a method and system for managing vehicle data that would overcome these and other disadvantages.

SUMMARY OF THE INVENTION

The present invention is directed to a method for managing subscriber vehicle data in a vehicle data management system that includes receiving and storing vehicle data, associating at least one client class with at least one corresponding targeted data format, receiving a client data request from a client, determining a client identity based on the client data request; and providing targeted data to the client responsive to the data request. The targeted data format is based on the determination of the identified client requesting the client data.

In accordance with another aspect of the invention, a system for vehicle data management system is provided having means for receiving and storing vehicle data, means for associating at least one client class with at least one corresponding targeted data format, means for receiving a client data request from a client, means for determining a client identity based on the client data request, and means for providing targeted data to the client responsive to the data request wherein the targeted data format is based on the determination of the identified client requesting the client data.

In accordance with yet another aspect of the invention, a computer readable medium is provided. Computer readable code is provided for storing received vehicle data, for associating at least one client type with at least one corresponding targeted data format, for determining a client type based on a client data request received from the client, and for providing targeted data to the client responsive to the data request. The targeted data format is based on the determination of the client type requesting the client data.

In still another aspect of the invention, an article for managing subscriber vehicle data in a vehicle data management system is described having a computer readable modulated carrier wave embodying means embedded in the modulated carrier wave for storing received vehicle data, means for associating at least one client class with at least one corresponding targeted data format, means for determining a client identity based on a received client data request and means for providing targeted data to the client responsive to the data request.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENT

Figure 1:
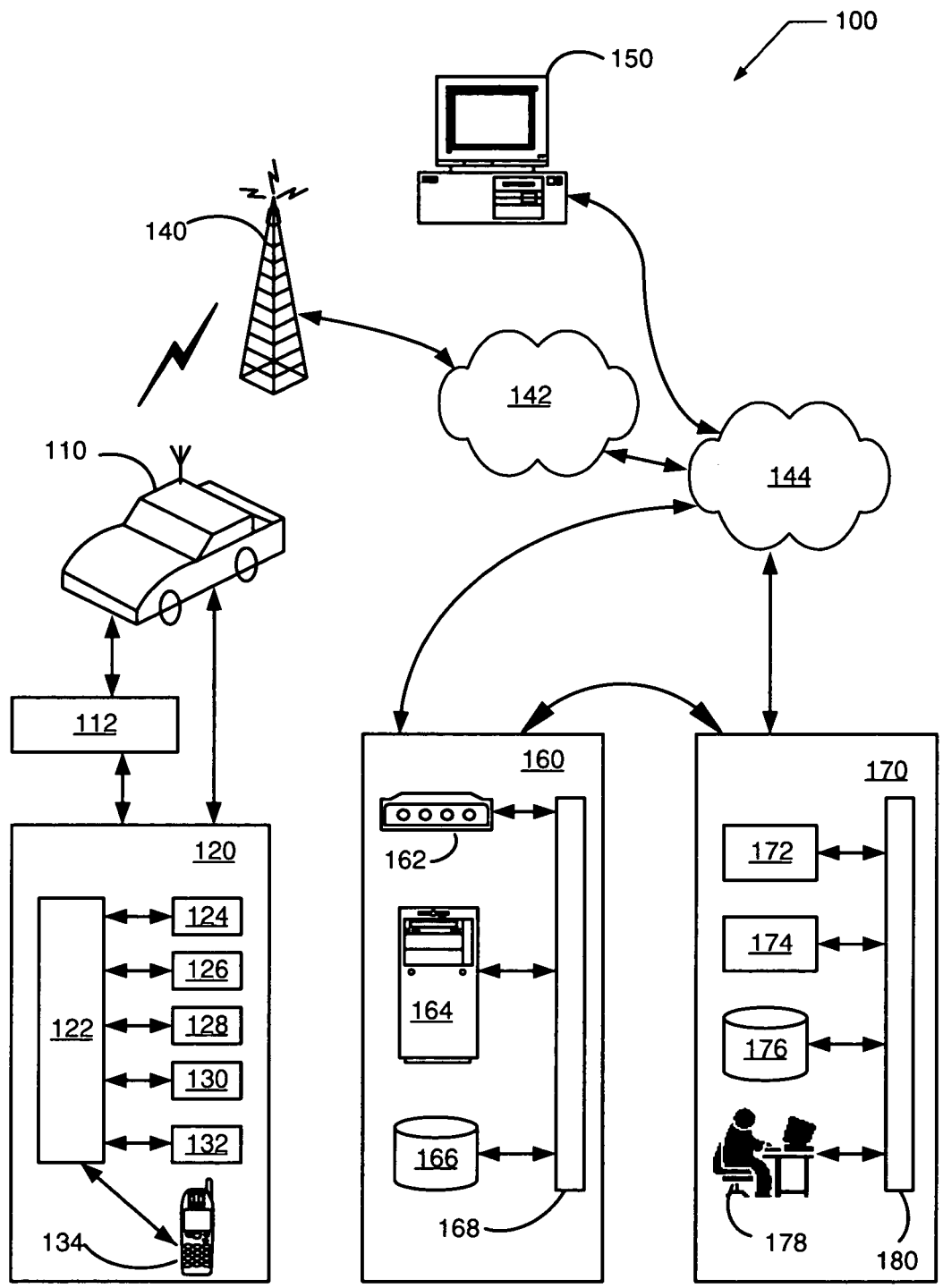
FIG. 1 is a diagram of an exemplary operating environment for managing subscriber vehicle data in an embodiment of the present invention.

FIG. 1 is an illustrative operating environment for managing subscriber vehicle data in an embodiment of the present invention. FIG. 1 shows a mobile vehicle communication system (MVCS) 100. Mobile vehicle communication system 100 includes mobile vehicle 110, vehicle communication bus 112, telematics unit 120, one or more wireless carrier systems 140, one or more communication networks 142, one or more land networks 144, one or more client, personal or user computers 150, one or more web-hosting portals 160, and one or more call centers 170. In one embodiment, mobile vehicle 110 is implemented as a mobile vehicle equipped with suitable hardware and software for transmitting and receiving voice and data communications.

In an embodiment, vehicle communications unit 120 is a telematics unit that includes a digital signal processor (DSP) 122 connected to a wireless modem 124, a global positioning system (GPS) unit 126, an in-vehicle memory 128, a microphone 130, one or more speakers 132, and an embedded or in-vehicle mobile phone 134. DSP 122 may be a general purpose processor, microcontroller, controller, host processor, or vehicle communications processor. In an example, DSP 122 is implemented as an application specific integrated circuit (ASIC). GPS unit 126 provides longitude and latitude coordinates of the vehicle, as well as a time stamp and a date stamp. In one embodiment, in-vehicle mobile phone 134 is a cellular-type phone, such as, for example an analog, digital, dual-mode, dual-band, multi-mode or multi-band cellular phone. In another example, the mobile telephone system is an analog mobile telephone system operating over a prescribed band nominally at 800 MHz. In another embodiment, the mobile telephone system is a digital mobile telephone system operating over a prescribed band nominally at 800 MHz, 900 MHz, 1900 MHz, or any suitable band capable of carrying mobile communications.

DSP 122 executes various computer programs that affect programming and operational modes of electronic and mechanical systems within mobile vehicle 110. DSP 122 controls communications between telematics unit 120, wireless carrier system 140, and call center 170. In one embodiment, a voice-recognition application is installed in DSP 122 to translate human voice input through microphone 130 into digital signals. DSP 122 generates and accepts digital signals transmitted between telematics unit 120 and a vehicle communication bus 112 that is connected to various electronic modules in the vehicle 110. In one embodiment, the digital signals activate the programming mode and operation modes, as well as provide for data transfers. In this embodiment, signals from DSP 122 are translated into voice messages and sent out through speaker 132.

Mobile vehicle 110, via a vehicle communication bus 112, sends signals to various units of equipment and systems within mobile vehicle 110 to perform various functions such as unlocking a door, setting personal comfort settings, and calling from telematics unit 120. In facilitating interactions among the various communication and electronic modules, vehicle communication bus interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one embodiment, vehicle communication bus 112 is a direct connection between connected devices.

Mobile vehicle 110, via telematics unit 120, sends and receives radio transmissions from wireless carrier system 140. Wireless carrier system 140 is implemented as any suitable system for transmitting a signal from mobile vehicle 110 to communication network 142. Wireless carrier system 140 incorporates any type of telecommunications in which electromagnetic waves carry signal over part of or the entire communication path. In one embodiment, wireless carrier system 140 transmits analog audio signals. In an example, wireless carrier system 140 transmits analog audio signals such as those sent from AM and FM radio stations and transmitters, or digital audio signals in the S band (approved for use in the U.S.) and L band (used in Europe and Canada). In one embodiment, wireless carrier system 140 is a satellite broadcast system broadcasting over a spectrum in the "S" band (2.3 GHz) that has been allocated by the U.S. Federal Communications Commission (FCC) for nationwide broadcasting of satellite-based Digital Audio Radio Service (DARS). In another example, wireless carrier system 140 includes a short message service, modeled after established protocols such as IS-637 SMS standards, IS-136 air interface standards for SMS, and GSM 03.40 and 09.02 standards. Similar to paging, an SMS communication could be broadcast to a number of regional recipients. In another example, the carrier uses services compliant with other standards, such as, for example, IEEE 802.11 compliant systems and Bluetooth systems. In another example, the carrier operates using CDMA, TDMA, GSM and any other appropriate standard.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to mobile vehicle 110 and land network 144.

In one embodiment, land network 144 is a public-switched telephone network (PSTN). In one embodiment, land network 144 is implemented as an Internet protocol (IP) network. In other embodiments, land network 144 is implemented as a wired network, an optical network, a fiber network, another wireless network, or any combination thereof. Land network 144 is connected to one or more landline telephones. Land network 144 connects communication network 142 to user computer 150, web-hosting portal 160, and call center 170. Communication network 142 and land network 144 connects wireless carrier system 140 to web-hosting portal 160 and call center 170.

Client, personal or user computer 150 includes a computer usable medium to execute Internet browser and Internet-access computer programs for sending and receiving data over land network 144 and optionally, wired or wireless communication networks 142 to web-hosting portal 160. Personal or user computer 150 sends data to web-hosting portal through a web-page interface using communication standards such as hypertext transport protocol (HTTP), and transport-control protocol Internet protocol (TCP/IP). In one embodiment, the data includes vehicle data such as user preferences and selections and operational modes of electronic and mechanical systems within mobile vehicle 110. In operation, a driver utilizes user computer 150 to initiate setting or re-setting of user-preferences for mobile vehicle 110. Various vehicle data from client-side software is transmitted to server-side software of web-hosting portal 160. Other vehicle data is stored at web-hosting portal 160.

Web-hosting portal 160 includes one or more data modems 162, one or more web servers 164, one or more databases 166, and a network 168. Web-hosting portal 160 is connected, in one embodiment, directly by wire to an IP network, or connected by phone lines to land network 144, which is connected to call center 170 Web-hosting portal 160 is connected to land network 144 by one or more data modems 162. Land network 144 sends digital data to and from modem 162, and this data is subsequently transferred to web server 164. In one embodiment, modem 162 resides inside web server 164. Land network 144 transmits data communications between web-hosting portal 160 and call center 170.

Web server 164 is configured to transmit data to and receives data from user computer 150 via land network 144. In alternative embodiments, user computer 150 includes a wireless modem to send vehicle data to web-hosting portal 160 through a wireless communication network 142 and a land network 144. Data is received by modem 162 and sent to one or more web servers 164. In one embodiment, web server 164 is implemented as any suitable hardware and software capable of providing web services to transmit and receive vehicle data from user computer 150 to telematics unit 120 in mobile vehicle 110. Web server 164 sends to or receives data transmissions from one or more databases 166 via network 168. Web server 164 includes computer applications and files for managing vehicle data and generating targeted data.

In one embodiment, one or more web servers 164 are networked via network 168 to distribute vehicle data among its network components such as database 166. In an example, database 166 is a part of or a separate computer from web server 164. Web server 164 sends data transmissions to call center 170 via an IP network, and through land network 144.

Call center 170 is a location where many calls are received and serviced at the same time, or where many calls are sent at the same time. In one embodiment, the call center is a telematics call center, facilitating communications to and from telematics unit 120 in mobile vehicle 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more networks 180.

Switch 172 of call center 170 connects to land network 144. Switch 172 transmits voice or data transmissions from call center 170, and receives voice or data transmissions from telematics unit 120 in mobile vehicle 110 through wireless carrier system 140, communication network 142, and land network 144. Switch 172 receives data transmissions from and sends data transmissions to vehicle 110. Switch 172 receives data transmissions from or sends data transmissions to one or more communication services managers 174 via one or more networks 180.

Communication services manager 174 is any suitable hardware and software capable of providing communication services to telematics unit 120 in mobile vehicle 110. Communication services manager 174 sends to or receives data transmissions from one or more communication services databases 176 via network 180. Communication services manager 174 sends to or receives data transmissions from one or more communication services advisors 178 via network 180. Communication services database 176 sends to or receives data transmissions from communication services advisor 178 via network 180. Communication services advisor 178 receives from or sends to switch 172 voice or data transmissions.

Communication services manager 174 facilitates one or more services, such as, but not limited to, enrollment services, navigation assistance, directory assistance, roadside assistance, business or residential assistance, information services assistance, emergency assistance, and communications assistance and vehicle data management services. Communication services manager 174 receives service requests for services from a user via user computer 150, web-hosting portal 160, and land network 144. Communication services manager 174 transmits and receives vehicle data to telematics unit 120 in mobile vehicle 110 through wireless carrier system 140, communication network 142, land network 144, voice and data switch 172, and network 180. Communication services manager 174 stores or retrieves vehicle data and information from communication services database 176. Communication services manager 174 may provide requested information to communication services advisor 178.

In one embodiment, communication services advisor 178 is a real advisor. In another embodiment, communication services advisor 178 is implemented as a virtual advisor. In an example, a real advisor is a human being at service provider service center in verbal communication with service subscriber in mobile vehicle 110 via telematics unit 120. In another example, a virtual advisor is implemented as a synthesized voice interface responding to requests from telematics unit 120 in mobile vehicle 110.

Communication services advisor 178 provides services to telematics unit 120 in mobile vehicle 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicates with telematics unit 120 in mobile vehicle 110 through wireless carrier system 140, communication network 142, and land network 144 using voice transmissions, or through communication services manager 174 and switch 172 using data transmissions. Switch 172 selects between voice transmissions and data transmissions.

Mobile vehicle 110 initiates service requests to call center 170 by sending a voice or digital-signal command to telematics unit 120 which in turn, sends an instructional signal or a voice call through wireless modem 124, Internet Protocol (IP) over packet data network wireless carrier system 140, communication network 142, and land network 144 to call center 170. In another embodiment, the service request is for a vehicle data upload. In yet another embodiment, the mobile vehicle 110 receives a request from call center 170 to send various vehicle data from mobile vehicle 110 through telematics unit 120, wireless modem 124, wireless carrier system 140, communication network 142, and land network 144 to call center 170.

Figure 2:
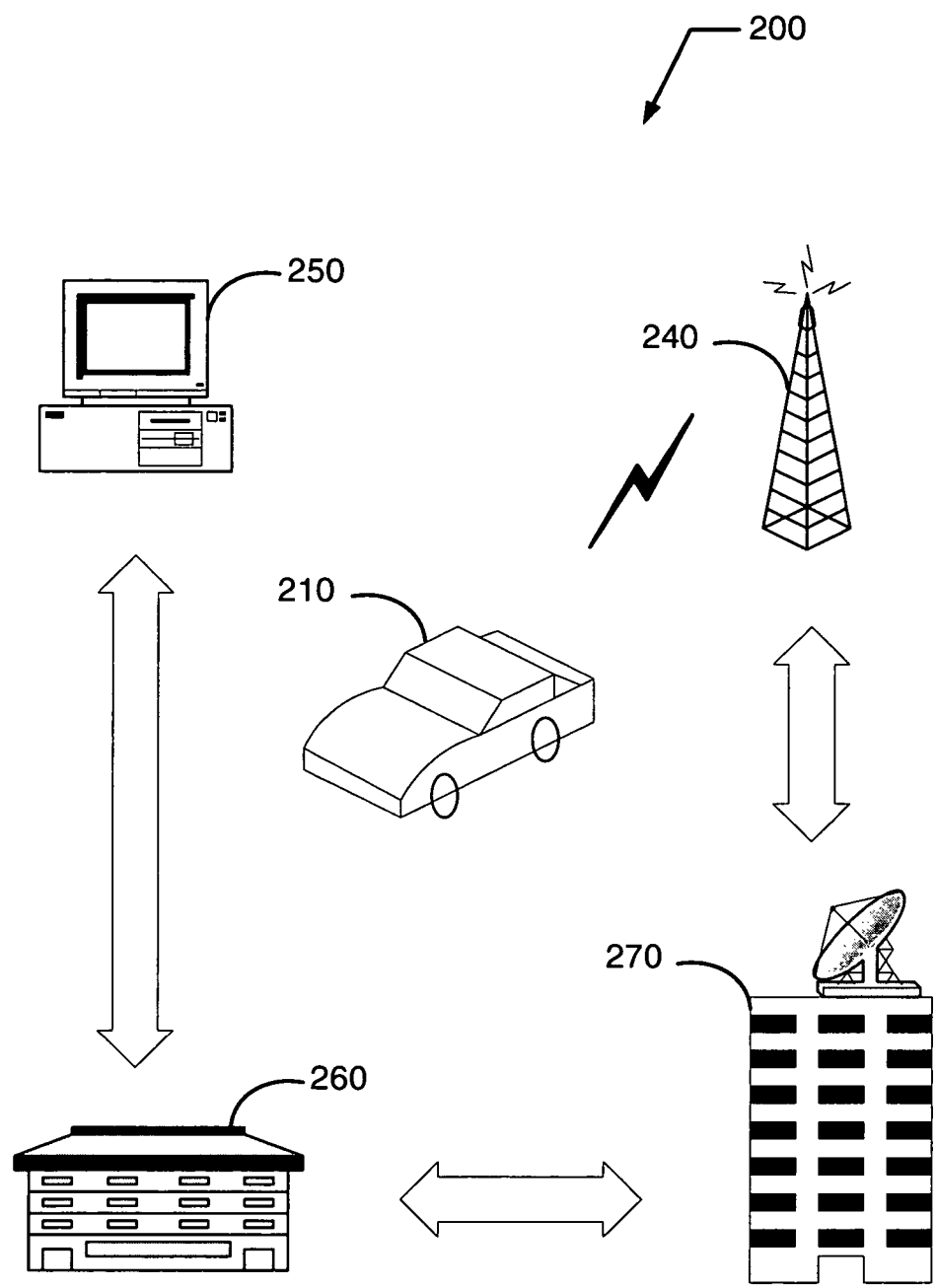
FIG. 2 is a block diagram of a second exemplary operating environment for managing subscriber vehicle data in an embodiment of the present invention.

FIG. 2 is a block diagram of a second exemplary operating environment for managing subscriber vehicle data in an embodiment of the present invention. FIG. 2 shows a vehicle communications subscriber service system 200. The vehicle communications subscriber service system 200 comprises one or more mobile vehicles 210, one or more wireless carrier systems 240, one or more user client devices 250, one or more web-hosting portals 260, and one or more call centers 270. Mobile vehicle 210 further includes a vehicle telematics device such as telematics device 120 of FIG. 1. In one embodiment, the vehicle communications subscriber service system 200 is implemented to provide a system for vehicle data management. Each vehicle 210 of vehicle communications subscriber service system 200 is uniquely identifiable within system 200, through one or more identifiers, at any time a telematics-enabled vehicle 210 is operational.

A driver, subscriber or user of a mobile vehicle 210 utilizes a client device 250 to access the website of web-hosting portal 260, which is configured to provide interactive data management services for a vehicle data management system. The website comprises a web portal framework including web pages and on-demand portlets, or web components that process requests and generate dynamic content. The term "portlet" is broadly defined herein, and includes any appropriate web component that processes requests and generates dynamic content. A portlet may be managed by a container, and may be a pluggable user interface component to provide a presentation layer to information systems. The web pages are organized according to client and subscriber identity and status, vehicle make and model, features available on a particular vehicle model, service records, record of last updated user preference or any other vehicle data such as vehicle mileage, error codes and mechanical and electrical data, subscriber subscription service data and other vehicle related data.

Server-side web software provided by web-hosting portal 260 secures various subscriber information through user identification numbers, vehicle identification numbers, passwords, and any other identification processes to insure that only an authorized user or subscriber of a telematics service gains access to a particular vehicle data profile. A hierarchical status system provides access to vehicle data depending upon the user's status or role. The role-based hierarchy system provides a rule set to personalize and therefore manage vast quantities of vehicle data across many users having different information and services requirements.

For example, a user with "portal administrator" status has access to perform portlet configuration, create new web-portal features and manage databases and the like. In one embodiment, web portlet frameworks are created, modified and managed by the "portal administrator" based on parameters such as vehicle make and model changes, subscription service changes and other changes necessary to provide customer service. The portal manager, directly or through automated software processes, associates client classes with corresponding targeted data formats in the form of class-appropriate portlets, by defining the role-based hierarchy for each client class that associates specific vehicle data with each status and then builds a data format template for each client class based on the role based hierarchy.

Defining a client's role, or status, and determining the class of the requesting device, therefore allows a personalized presentation of various vehicle data and real-time services that match both the client device capabilities and the user's data requirements and specific interests.

A user with "campaign manager" status has access to features that allow the creation and analysis of targeted advertising content data. A user with "data analyst" status has access to various vehicle data for one or more vehicles to perform statistical analyses. A user with "subscriber-customer" status has access to vehicle data specific to the user's vehicle such as actual near real-time odometer readings, near real-time mechanical condition and maintenance records, lease or loan terms, subscriber terms and customizable vehicle options, and various targeted data such as coupons, lease or purchase incentives, vehicle alert and recall data, and other data of interest to a consumer of the specific vehicle and subscriber services. Generally, each status of the hierarchy has a unique set of access privileges, although in some implementations access privileges between various hierarchical statuses overlap. In an embodiment, an authorized user can request near real-time data from one or more specific vehicles that is then retrieved and presented to the user based on the type of device that the user is interfacing with.

In one embodiment, web-hosting portal 260 includes a voice portal framework for enabling communication with cell phones and other voice enabled devices such as a VCU. In another embodiment, web-hosting portal 260 includes vehicle data access and collection components. In yet another embodiment, call center 270 includes the vehicle data access and collection components.

Through the web-hosting portal 260, a client device 250 accesses various vehicle data such as real-time vehicle system data, advertisements and analytic data, and provides customer entered data, user instructions or user preferences for processing and storage. Vehicle data are presented to client device 250 in a targeted manner depending on the device class, identity and status of the requesting client and user. Client device 250 classes include personal computers (PC), personal digital assistants (PDA), cell phones, vehicle telematics units (VCU) and other devices configured to receive and utilize voice and web-based data. In one embodiment, server-side and optionally client-side form validation are used to prevent the user from selecting unavailable, incorrect, or conflicting options or preferences for the client class requesting the vehicle data. Vehicle data includes, but is not limited to, vehicle make and model data, vehicle lease or loan data, customer identification data, client class and status data, vehicle subscription service data, vehicle related advertisements, various vehicle system mechanical and operational data, personalized vehicle settings data, vehicle service record and service interval data.

In one embodiment, after a vehicle data request or preference change is issued from a client, the user is prompted to verify the data request and user identification again before the web-hosting portal 260 sends the vehicle data request to call center 270.

The web-hosting portal 260 sends the vehicle data request to the communication services manager of call center 270. The call center 270 processes a telematics service request for the vehicle data via a combination of one or more types of networks, databases and wireless carrier systems 240.

In one embodiment, the telematics unit of mobile vehicle 210 receives a request to provide updated vehicle information, and activates telematics unit functions that send signals to electronic controllers and equipment in the vehicle 210 to obtain various vehicle parameters that correspond to the vehicle data request.

The system depicted in FIG. 2 illustrates the path of vehicle data communicated to and from user computer 250 through web-portal interface 260 and service provider 270 to mobile vehicle 210 via wireless carrier 240. In one embodiment, the user client device 250 is implemented as a vehicle telematics unit coupled to mobile vehicle 210. In the present embodiment, the vehicle telematics unit is configured for interfacing with a web-portal through either a web or voice framework. User requests and data are communicated between the client device 250 and the web portal 260. The web portal 260 communicates vehicle data between the client device 250 and the service provider 270. The service provider 270 communicates data between the web portal 260 and the wireless carrier system 240. The wireless carrier system 240 communicates vehicle data between the service center 270 and the mobile vehicle 210. In an embodiment, various components of vehicle communications subscriber service system 200 are embodied in a computer readable modulated carrier wave.

Figure 3:
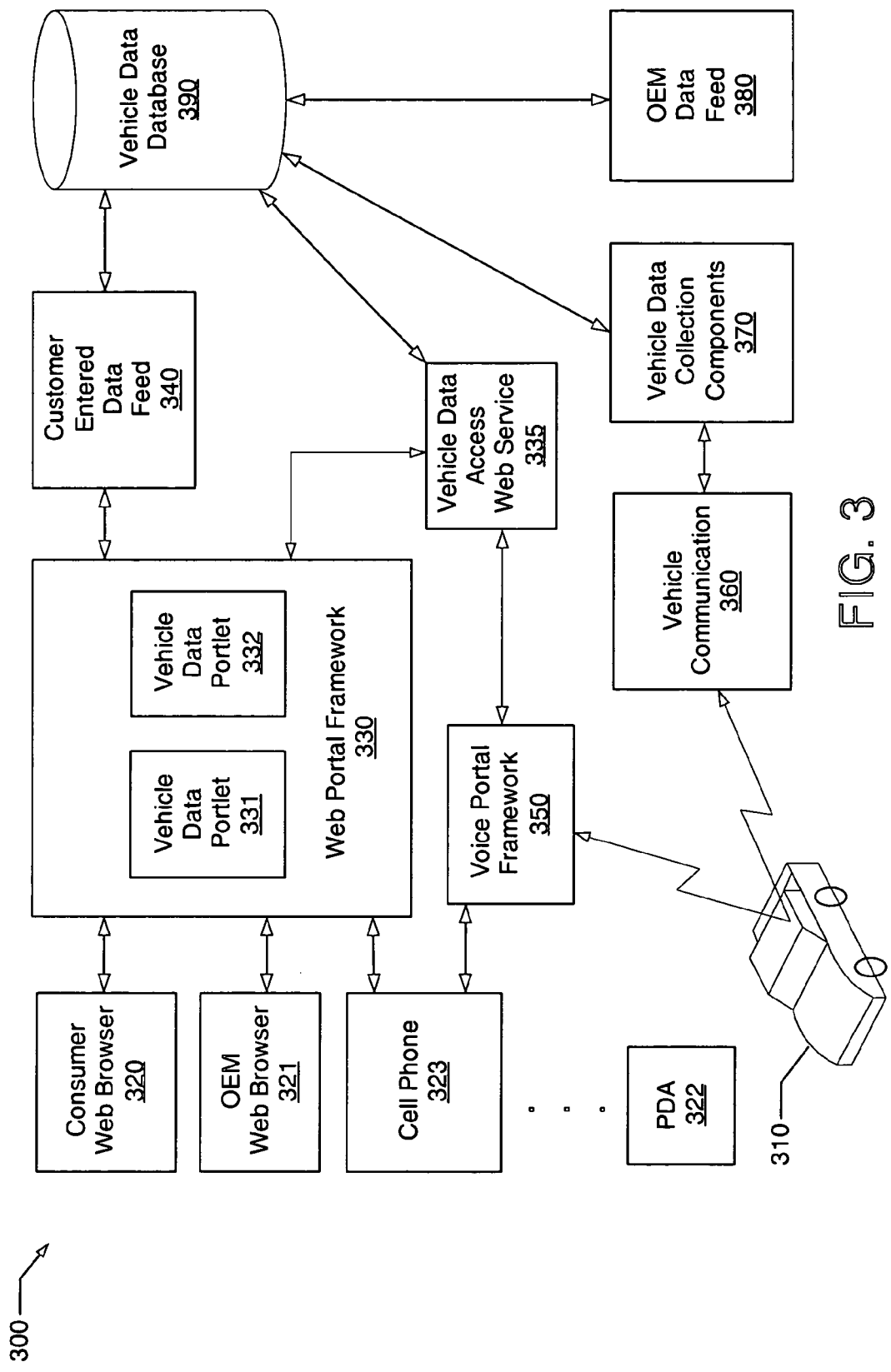
FIG. 3 is a block diagram of a vehicle data management system in an embodiment of the present invention.

FIG. 3 is a block diagram of a vehicle data management system in an embodiment of the present invention. FIG. 3 shows a vehicle data management system 300. Vehicle data management system 300 includes mobile vehicle 310, web portal framework 330, voice portal framework 350, vehicle data access web service component 335, vehicle communication component 360, vehicle data collection components 370, vehicle data database 390 and several client devices including web browser client 320, web browser client 321, PDA 322 and cell phone 323. Web browser client 320 represents a vehicle telematics subscription service consumer at a web browser. Web browser client 321 represents an original equipment manufacturer (OEM) of a vehicle or vehicle telematics subscription service at a web browser. Additional web browser clients comprise campaign manager and data analyst web browsers. Additional client devices not shown are indicated by an ellipsis. Vehicle data management system 300 also includes customer entered data feed 340 and OEM data feed 380. Web portal framework 330 includes vehicle data portlet 331 and vehicle data portlet 332. In an embodiment, mobile vehicle 310 is a vehicle incorporating a vehicle communications system as in mobile vehicle 210 of FIG. 2.

In one embodiment, web portal framework 330, voice portal framework 350 and vehicle data access web service 335 are software and hardware components integrated with a web-hosting portal, such as web-hosting portal 260 of FIG. 2, to provide server-side vehicle data management services for various classes of client devices. In another embodiment, vehicle data access web service 335 is implemented as a call center such as call center 270 of FIG. 2.

A client device, such as a computer running a web browser, exchanges data with web portal framework 330 through a protocol such as hypertext transfer protocol (HTTP). Status-based rules govern the portlet type that is invoked by an HTTP data request from a client. Web browser 320 illustrates a consumer at a web browser accessing the web portal framework 330. A vehicle data portlet such as portlet 331 is invoked based on determining a client identity from the client data request. The invoked portlet then provides targeted data to the web browser responsive to the data request. The targeted data format is based on the determination of the identified client requesting the client data, in the present case a consumer. The data is targeted in part through the format of the portlet, that is, the content and presentation of requested vehicle data is determined in whole or part by the portlet that is invoked. Therefore, the status of the user/client requesting data is determined in order to match the client data request with the correct user status.

For example, an OEM at a web browser is represented by web browser 321. A vehicle data portlet such as portlet 332 is invoked and instantiated based on determining that the client identity is an OEM at a web browser through the client data request. The portlet 332 then provides vehicle data targeted to the OEM web browser responsive to the data request. In one embodiment, the portlet for an OEM 332 provides options for OEM-specific data entry and server-side tools such as statistical analysis software applications. The tools and accessible data as well as the layout of the OEM-specific portlet are necessarily different from that of the consumer.

In another embodiment, a PDA 322 is a client device. The PDA may access the voice portal framework 350 or the web portal framework 330 depending on wireless services and PDA 322 configuration. The voice portal framework 350 and the web portal framework 330 are configured to recognize the class of the client device and generate an appropriate response based on a client request.

In yet another embodiment, a cell phone 323 is a client device. The cell phone 323 accesses the voice portal framework 350 to implement a data request and may additionally access the web portal framework 330 when equipped with a visual display and enabling hardware and software. In still another embodiment, a client data request contains identifying information that may be parsed to determine the type, or class, of the requesting device and the status, or role, of the user requesting data through the client device. Various other details of web and voice portal framework and web service implementations are known to those skilled in the art and therefore will not be further elaborated.

In an embodiment, vehicle communication component 360 is implemented as a wireless carrier system as in wireless carrier 240 of FIG. 2. Vehicle data collection components are software and hardware components implemented to facilitate vehicle data collection. In one embodiment, vehicle data collection components 370 are implemented as a service provider such as service provider 270 of FIG. 2. In another embodiment, a vehicle data database 390 is implemented as a service provider such as service provider 270 of FIG. 2. In yet another embodiment, vehicle data database 390 is implemented as a web-hosting portal such as web-hosting portal 260 of FIG. 2. Vehicle data database 390 is a repository for various types of vehicle data obtained through numerous data channels that is accessed for vehicle data retrieval. In one embodiment, a data channel is a customer entered data feed 340. Data entered by a subscriber through a web browser, or through a call center is represented by data feed 340. In another embodiment, an OEM data feed 380 is another data channel for data to be stored to vehicle data database 390. In yet another embodiment, a web portal framework is a data channel for vehicle data to be stored to vehicle data database 390, directly or indirectly, such as through vehicle data access web service 335. In still another embodiment, vehicle data collection component 370 is a data channel for vehicle data database 390. Various types of vehicle data may be stored to vehicle data database 390 and later retrieved through data channels such as a vehicle communication unit, a web portal, a database, a service provider, a cell phone, and a personal digital assistant.

In the following process flow discussion, certain steps may be combined, performed simultaneously, repeated or performed in a different order without altering the function of an embodiment of the invention.

Figure 4:
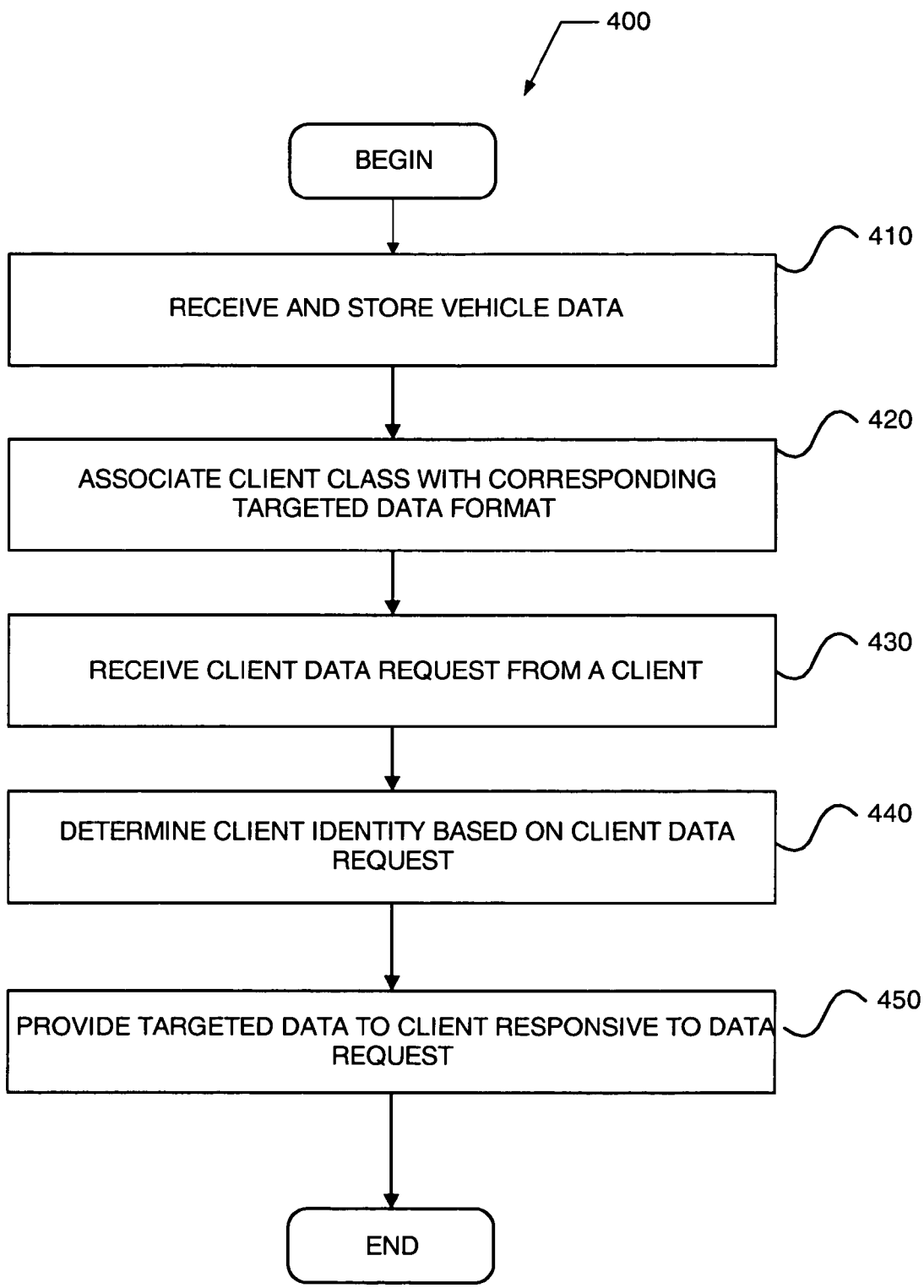
FIG. 4 is a flow diagram of method for managing vehicle data in a vehicle data management system in an embodiment of the invention.

FIG. 4 is a flow diagram of method for managing vehicle data in a vehicle data management system in an embodiment of the invention. FIG. 4 shows a process 400 for managing subscriber vehicle data in a vehicle data management system. Process 400 begins in step 410.

In step 410, vehicle data is received and stored. Vehicle data are received from one or more data channels and are received at any time, continuously or in discrete intervals, simultaneously or serially. In one embodiment, step 410 occurs simultaneously with other steps of process 400. Vehicle data are in any suitable form for storage. Generally, vehicle data is stored upon receipt, but in an implementation is cached and stored at a later time. Vehicle data includes, but is not limited to, vehicle make and model data, vehicle lease or loan data, customer identification data, client class and status data, vehicle subscription service data, vehicle related advertisements, vehicle mechanical and near real-time operating parameter data, personalized vehicle settings data, vehicle service record and service interval data and analytic vehicle data. In one embodiment, vehicle data is received through a web-hosting portal 260, a service provider 270 and wireless carriers 240 and stored in vehicle data database 390.

In step 420, a client class is associated with a corresponding targeted data format. A client class is a client device type such as a computer running a web browser, a PDA, and a cell phone. Each client class requires data to be delivered in a specific data format that is compatible with the device. In one embodiment, associating a client device with a corresponding targeted data format further comprises defining a role based hierarchy for each client class that associates specific vehicle data with each status, and building a data format template for each client class based on the role-based hierarchy. In one embodiment, a client class may be associated with a corresponding targeted data format at any time. In another embodiment, associating a client class with a targeted data format is manually implemented by a portal administrator. In another embodiment, associating a client class with a targeted data format is implemented automatically using software. In yet another embodiment, the data format template is a web portlet configuration. In still another embodiment, the data format template is a voice portal configuration. Defining a role-based hierarchy provides a rule set to determine what type and form of vehicle data to provide to a client device of each class upon request. Other examples of user roles include, but are not limited to, subscription service customer, campaign manager, engineer, data analyst, and fleet manager. In each case, the user role is accorded a status having a particular vehicle data access profile and privileges.

In step 430, a client data request is received from a client device. The client data request is received at any time. In one embodiment, the client data request is a hypertext transport protocol (HTTP) request. In an embodiment, the client data request contains data that identifies the class of the client device and the status and identity of the user associated with the client data request. The client data request is in a form that is recognized by a web server 164, a communications services manager 174 or another component such as a web portal framework 330 or a voice portal framework 350 to which the data request is received. A data request parser is included in any device that will receive a data request. The practical application of string parsers will be known to those skilled in the art and therefore will not be further discussed.

In step 440 a client identity is determined based on the client data request. In one embodiment, determining a client identity comprises parsing the client data request for client identity data and determining the hierarchical role of the client from the parsed data request. The data request is parsed at any time after receipt. In another embodiment a client data request is in a form that identifies the client without requiring parsing.

In step 450, targeted data is provided to a client device in response to the data request where the targeted data format is based on the determination of the identified client requesting the client data. In one embodiment, providing targeted data comprises instantiating a communication portlet that is associated with the determined client class, identity and role, retrieving vehicle data based on the communication portlet and populating the communication portlet with the retrieved vehicle data.

In another embodiment, vehicle data is retrieved from a telematics unit of a vehicle that is identified by the client data request. Vehicle data such as odometer readings, error and service codes, fluid levels, and other near real-time vehicle system data are retrieved on demand from a vehicle. In one embodiment, a user implements a vehicle data retrieval from a telematics unit through a portal using a voice or data entry command. In another embodiment, an automated process retrieves vehicle data whenever a client device logs in to a portal framework and is identified and is matched to a specific vehicle. In yet another embodiment, various vehicle data are retrieved by a data analyst or engineer from one or more vehicles to perform statistical analysis or to monitor specific vehicle model performance metrics.

In yet another embodiment, the portlet is configured to provide targeted data to client classes selected from group the consisting of a cell phone, a web browser, and a PDA. Each client device is a class that requires specific data formats and communication protocols, some of which are not compatible. In order to maximize the number and variety of client devices that are useable with the vehicle data management system, a portlet or portal configuration routine is implemented for each device type. Further customization and personalization of vehicle data presentation is possible.

In still another embodiment, the targeted data includes advertisements that are selected based on the class, role and identity of the client. Targeted data includes both data and the presentation format for the data. Once a client device is identified for class, identity and status, advertisements may be customized for the identified user. In one embodiment, a customer logs in to a web portal and a portlet is instantiated and populated. Various vehicle data, including near real-time vehicle data for the customer's vehicle is available through the client device. In one embodiment, the customer portlet has been configured by a portal administrator and a campaign manager to compare near real-time odometer readings with recommended service intervals for the customer's vehicle and service records to determine the last service date. The portlet upon population then generates coupons or other targeted advertisements and incentives in the field of the portlet that may be redeemed electronically or printed for use. In another embodiment, a customer is notified of upcoming dealer service specials, lease options or unadvertised trade-up offers. Other examples of targeted data include advertisements for vehicle insurance, additional service provider options or calling time, and optional equipment and accessories of interest to the customer of a particular make and model of vehicle and demographic. In one embodiment, an advertising campaign manager through a portlet may retrieve and compile data reports that analyze the effectiveness of a particular targeted advertising campaign. In another embodiment, targeted data includes data retrieved in near real-time from a customer's vehicle from one or more diagnostic vehicle system performance monitors. The targeted data generates incentives to encourage customers to service their vehicle when the diagnostic monitors indicate that a vehicle system requires service.

In an embodiment, the targeted data includes analytical data that are selected based on the client request. Analytic data includes compiled raw and analyzed vehicle data for more than one vehicle including data such as vehicle mechanical histories, service records, frequency of repairs, occurrences of specific repairs or complaints, equipment wear data, statistical compilations and reports, and other relevant data. In one embodiment, a fleet manager is presented with vehicle reports and portlets for specific vehicles for which the manager is responsible. The analytic data presented to the fleet manager allows near real-time monitoring of a multiple vehicle service records so that the condition of fleet vehicles under lease may be monitored for proper care. In another embodiment, an OEM engineer logs in to the vehicle data management system through a web browser and is provided with reports and portlets for a range or line of vehicles. Ongoing engineering development and quality management is facilitated by the access to customized and comprehensive vehicle data. The device-agnostic data management method of the present invention allows for multiple devices to simultaneously have access to parallel data channels including analytic data and other such targeted data forms.

In yet another embodiment, individual maintenance and preventative services are provided for subscriber vehicles. For example, various vehicle system performance parameters are retrieved in near real-time by a subscriber, a dealer or a maintenance and servicing agent to a client device. The retrieved data is targeted data that allows for the requesting party to proactively manage vehicle performance parameters and implement preventative maintenance, or aid in the early diagnosis of vehicle system malfunctions prior to a serious system failure.

Other uses for the targeted data include enthusiast groups such as car clubs, and advanced vehicle system management such as software upgrades.

The present invention may be embodied in other specific forms without departing from its spirit or essential characteristics. The described embodiments are to be considered in all respects only as illustrative and not restrictive.

We claim:

1. A method for managing subscriber vehicle data in a vehicle data management system in a computer, comprising:
   receiving the vehicle data into the vehicle data management system in the computer;
   storing the vehicle data in the vehicle data management system in the computer;
   securing access to data in the vehicle data management system in the computer according to a status based hierarchy by associating specific vehicle data access privileges with individual client statuses, the individual client statuses being selected from the group consisting of subscription service customer, campaign manager, engineer, data analyst, call center advisor, portal administrator, and fleet manager;
   building, via the vehicle data management system in the computer, a data format template for each client device class associated with the vehicle data management system based on the status based hierarchy, the client device class selected from the group consisting of personal computers, personal digital assistants, cell phones, and vehicle telematics units;
   receiving a client data request from a client via a requesting device;
   determining a client identity in the vehicle data management system in the computer based on the client data request, the client identity including a position of the client in the status based hierarchy and a class of the requesting device of the client, wherein the requesting device class is selected from the group consisting of personal computers, personal digital assistants, cell phones, and vehicle telematics units;
   retrieving targeted vehicle data from a data source in operative communication with the client data management system for responding to the client data request, the retrieved targeted vehicle data being based on the client's individual client status in the status based hierarchy;
   formatting, via the vehicle data management system in the computer, the retrieved targeted vehicle data according to the data format template that corresponds with the identified client's requesting device class and position in the status based hierarchy; and
   providing the formatted targeted vehicle data from the vehicle data management system in the computer to the client responsive to the data request.

2. The method of claim 1 wherein the formatted targeted vehicle data is configured to be retrievable through a web hosting portal.

3. The method of claim 2 wherein the formatted targeted vehicle data is configured to be retrievable through a voice-enabled web hosting portal.

4. The method of claim 1 wherein determining the client identity comprises:
   parsing the client data request for client identity data.

5. The method of claim 1 wherein providing the formatted targeted vehicle data comprises:
   instantiating a communication portlet that is associated with the determined requesting device class, client identity and client status;
   and
   populating the communication portlet with the formatted vehicle data.

6. The method of claim 1 wherein the formatted targeted vehicle data includes advertisements that are selected based on the requesting device class, status and identity of the client.

7. The method of claim 1 wherein the formatted targeted vehicle data includes analytical data that are selected based on the client request.

8. The method of claim 1 wherein retrieving targeted vehicle data is accomplished by requesting the vehicle data from a vehicle communications unit of a vehicle that is identified by the client data request.

9. The method of claim 1 wherein the targeted vehicle data is selected from the group consisting of subscription service data, vehicle operating data, vehicle maintenance data, and vehicle lease data.

10. A non-transitory computer readable medium storing a computer program, comprising:
    computer readable code for securing access to data in a vehicle data management system according to a status based hierarchy by associating specific vehicle data access privileges with individual client statuses, the individual client status being selected form the group consisting of subscription service customer, campaign manager, engineer, data analyst, call center advisor, portal administrator, and fleet manager;
    computer readable code for building a data format template for each client device class associated with the vehicle data management system based on the status based hierarchy, the client device class selected from the group consisting of personal computers, personal digital assistants, cell phones and vehicle telematics units;
    computer readable code for receiving a client data request from a client via a requesting device;
    computer readable code for determining a client identity in the vehicle data management system based on the client data request, the client identity including a position of the client in the status based hierarchy and a class of the requesting device of the client, wherein the requesting device class is selected from the group consisting of personal computers, personal digital assistants, cell phones, and vehicle telematics units;
    computer readable code for retrieving targeted vehicle data from a data source in operative communication with the client data management system for responding to the client data request, the retrieved targeted vehicle data being based on the clients individual client status in the status based hierarchy; and
    computer readable code for providing the formatted targeted vehicle data from the vehicle data management system to the client responsive to the data request.

11. The computer readable medium of claim 10 wherein computer readable code for determining the client identity comprises:
    computer readable code for parsing the client data request for client identity data.

12. The computer readable code of claim 10 wherein computer readable code for providing the formatted targeted vehicle data comprises:

computer readable code for instantiating a communication portlet that is associated with the determined client requesting device class, client identity and client status; and computer readable code for populating the communication portlet with the formatted vehicle data.

13. The computer readable medium of claim 12 wherein the computer readable code for retrieving targeted vehicle data includes computer readable code for retrieving targeted vehicle data from a VCU of a vehicle that is identified by the client data request.

14. A vehicle data management system, comprising:

means for securing access to data in the vehicle data management system according to a status based hierarchy based on associating specific vehicle data access privileges with individual client statuses, the individual client statuses being selected from the group consisting of subscription service customer, campaign manager, engineer, call center advisor, portal administrator, data analyst, and fleet manager;

means for building a data format template for each client device class associated with the vehicle data management system based on the status based hierarchy, the client device class selected from the group consisting of personal computers, personal digital assistants, cell phones, and vehicle telematics units;

means for receiving a client data request from a client via a requesting device;

means for determining a client identity in the vehicle data management system based on the client data request, the client identity including a position of the client in the status based hierarchy and a class of the requesting device of the client, wherein the requesting device class is selected from the group consisting of personal computers, personal digital assistants, cell phones, and vehicle telematics units;

means for retrieving targeted vehicle data from a data source in operative communication with the client data management system for responding to the client data request, the retrieved targeted vehicle data being based on the client's position in the status based hierarchy;

means for formatting the retrieved targeted vehicle data according to the data format template that corresponds with the identified client's requesting device class and position in the status based hierarchy; and means for providing the formatted targeted vehicle data from the vehicle data management system to the client responsive to the data request.

* * * * *